United States Patent [19]
Ellett

[11] 3,790,124
[45] Feb. 5, 1974

[54] TOGGLE LINKAGE VALVE ACTUATOR

[76] Inventor: James R. Ellett, 9211-75th St., Edmonton, Alberta, Canada

[22] Filed: Oct. 3, 1972

[21] Appl. No.: 294,749

[52] U.S. Cl. .................................... 251/58, 74/110
[51] Int. Cl. .......................................... F16k 31/165
[58] Field of Search ............ 74/99, 110; 251/58, 62

[56] References Cited
UNITED STATES PATENTS

| | | | |
|---|---|---|---|
| 2,435,143 | 1/1948 | Knauth | 251/58 X |
| 3,486,731 | 12/1969 | Magnani et al. | 251/58 |

*Primary Examiner*—Henry T. Klinksiek

[57] ABSTRACT

A toggle linkage valve actuator actuates a valve so as to obtain from the valve identical responses to above-maximum and below-minimum conditions as sensed by the actuator. The sensed condition is translated into mechanical movement of a piston and yoke assembly to which is pivotally attached a toggle bar biased away from the yoke but limited in its separation therefrom by a first adjustment means. Movement of the assembly away from the valve elicits the desired response as the toggle bar is mechanically connected to the valve. Movement of the assembly towards the valve brings the toggle bar into contact with a second adjustment means which reverses the direction of the toggle bar movement, thereby eliciting the same desired response from the valve.

8 Claims, 1 Drawing Figure

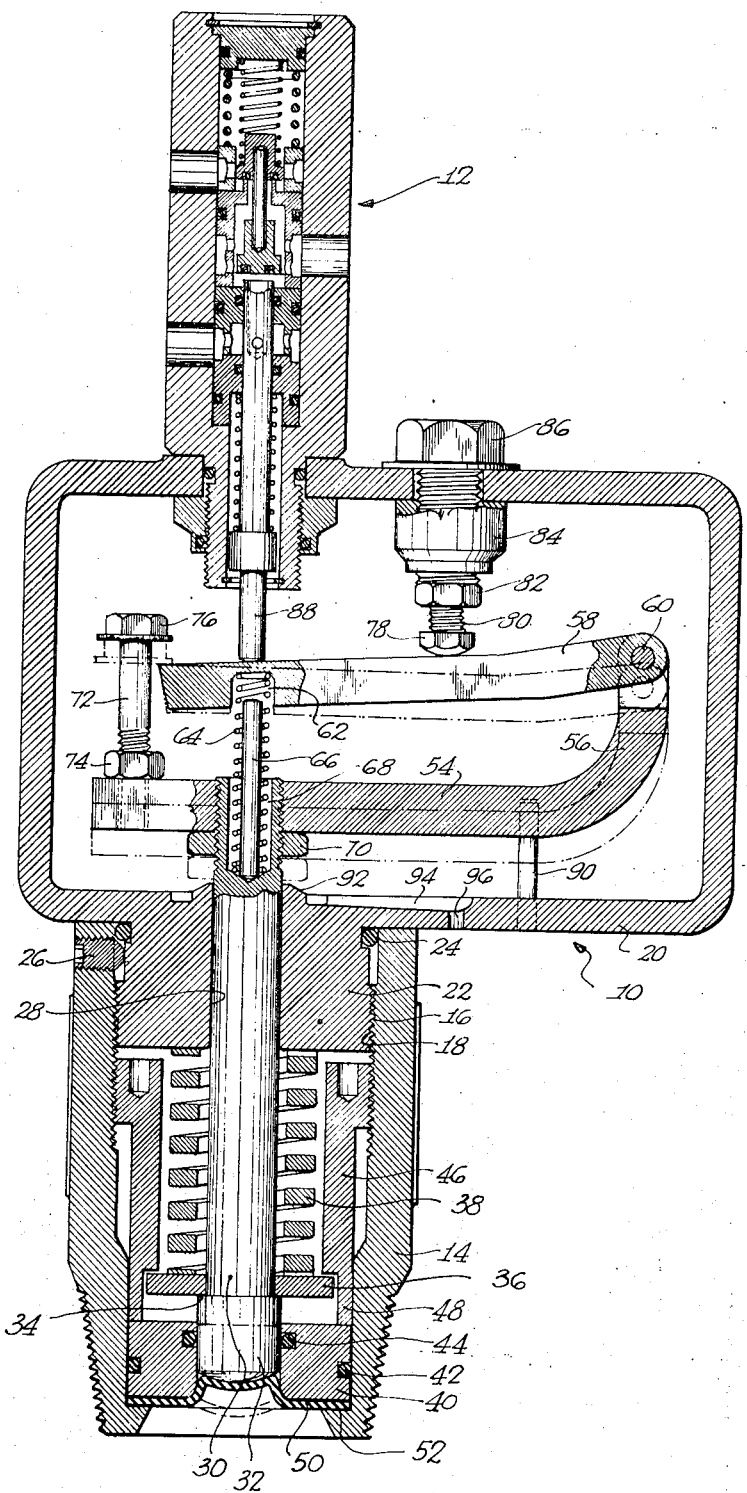

TOGGLE LINKAGE VALVE ACTUATOR

This invention relates to valve actuators and more particularly to a valve actuator responsive to both maximum and minimum conditions.

It is normally the function of valve actuators to actuate a valve in response to either an increase above a predetermined maximum pressure or to a decrease below a predetermined minimum pressure. In fact, most situations demand such a valve actuator. Situations do exist however whereby the same response in a valve is required when the measured quantity is either greater or less than the predetermined maximum or minimum respectively. The valve's opposite response is occasioned by a measured quantity between the minimum and maximum.

There have been attempts in the past to produce a valve actuation system operating as suggested but they have been complex and unwieldy. One such system involves a pressure operated bellows, a beam pivotally attached thereto, a pair of fulcrums associated with the beam, a counterweight and a mechanism for opening and closing a valve. That system is not adjustable as to setting the minimum and maximum pressures at which the valve will open and it requires multiple fulcrums.

The present invention overcomes those problems by providing a valve actuator which is readily adjustable and has but one pivot point. It provides an accurate and reliable method of actuating a valve.

The valve actuator of the present invention comprises sensing means for responding to a measurable quantity, a transfer means connected to the sensing means, an actuating means connected to the transfer means and resiliently biased away therefrom and means for adjusting the actuating means with respect to the transfer means.

The invention will now be more fully described with reference to the attached drawing showing a section through the actuator in use.

Valve actuator 10 is shown as being operatively connected to a three-way valve 12, which valve is merely illustrative of the valve mechanisms with which the valve actuator of the present invention might be associated.

Structurally, valve actuator 10 includes a base housing 14 which may be externally threaded for reception in a pressure conduit or in any housing containing an appropriate measurable quantity. While not essential to the invention, housing 14 may be generally cylindrical in shape. Internal threads 16 coact with external threads 18 on projection 22 to connect the linkage housing to base housing 20. The connection therebetween is sealed by O-ring 24 and locked by set screw 26. Projection 22 is provided with a central longitudinal bore 28 in which piston 30 is slidably received.

At the lower end of piston 30 is an extension 32 of a diameter slightly greater than that of the piston itself, so as to form a shoulder or step 34. An annular spring base plate 36 has its inner diameter such that it will sit on step 34 and thus retain spring 38 between itself and the underside of projection 22. In this manner the piston 30 is biased away from housing 20. Extension 32 is slidable within piston guide 40 which is held within base housing 14. O-rings 44 and 42 seal extension 32 to guide 40 and guide 40 to housing 14 respectively. Piston guide sleeve 46 is threaded into housing 14 so that its lower portion 48 locks guide 40 between itself and internal flange 52 of housing 14. Diaphragm 50 is also locked between guide 40 and flange 52, the diaphragm being operable under a suitable pressure influence to apply an axial force to piston 30.

Piston 30 is threaded externally at its other end and bored internally as at 68. Threaded to piston 30 is transfer yoke 54, the yoke being of a general L-shape, the leg thereof being essentially horizontal and the foot 56 thereof being essentially vertical. At the uppermost end of yoke 54 toggle bar 58 is pivotably attached as by pivot pin 60. Toggle bar 58 reverses the direction of yoke 54 and is provided with a recess 62 in its lower surface substantially above bore 68 in piston 30. Extending between the bottom end of bore 68 and the top end of recess 62 is transfer compression spring 64 guided by transfer spring guide 66. Spring 64 tends to bias movable toggle bar 58 away from yoke 54.

The amount that toggle bar 58 may be biased from yoke 54 is determined and set by low pressure adjusting screw 72. Screw 72 is so positioned that the free end of toggle bar 58 abuts against the underside of screw head 76. The height of screw head 76 above yoke 54 and hence the displacement of bar 58 away from yoke 54 is adjustable merely by turning screw 72 in or out with respect to yoke 54. Screw 72 may be locked in position with lock nut 74.

High pressure adjusting screw 80 is assembled into the top surface of housing 20 in a manner to be now described. Retainer 86 is received in a hole in housing 20 and affixed thereto by means of retainer lock nut 84. Retainer 86 has an axial threaded bore therein (not shown) into which adjusting screw 80 is threaded. Screw 80 may be locked in position with lock nut 82.

The valve actuator of the present invention will now be described with reference to valve assembly 12 and its own actuator 88. It must be remembered that valve assembly 12 gives two responses and it is desired that one of those responses is to be utilized for two separate positions of actuator 10.

Considering first actuation in response to a below-minimum condition, assume housing 14 is connected to a pressure system whereby the system pressure can act on diaphragm 50. Thus, in a low pressure situation, spring 38 will force piston 30 downwards against diaphragm 50 thereby also lowering transfer yoke 54, along with low pressure adjusting screw 72. The free end of toggle bar 58 is biased against the underside of screw head 76 and thus it is also lowered with piston 30. Valve actuating stem 88 is biased towards toggle bar 58 and it too will be lowered thereby providing one response in valve 12. As mentioned previously, the height of screw head 76 relative to toggle bar 58 determines the pressure at which valve 12 responds as desired.

Consider now actuation in response to an over-maximum condition. Diaphragm 50 will be forced upwardly against extension 32 of piston 30, overcoming the compression forces in spring 38 and raising piston 30 along with transfer yoke 54. Continued upward movement will bring the upper surface of toggle bar 58 into contact with the rounded head 78 of high pressure adjusting screw 80, at which point upward movement of toggle bar 58 ceases. Further upward movement of transfer yoke 54 and the consequent upward movement of pivot pin 60 causes the toggle bar 58 to rock on rounded head 78, thereby lowering the free end of toggle bar 58 whereby valve actuating stem 88 is lowered providing a response in valve assembly 12 identical to that provided in the below-minimum condition.

There is a dimensional consideration related to the length of toggle bar 58 and the position of the point of contact of adjusting screw 80 with respect to pivot pin 60 and valve actuating stem 88. Screw head 78 is desirably half way between pivot pin 60 and stem 88 so that motion upwards of pin 60 relative to screw head 78 results in an equal downward motion of stem 88. Thus the adjustment of the screw 80 can be readily determined and applied thereto to set the maximum pressure point.

In addition to the main features of the valve actuator herein described, ancillary features now described aid in providing smooth operation of the actuator. Roll pins 90 are mounted in housing 20 to prevent rotation of transfer yoke 54 around the axis of piston 30. They permit transfer yoke 54 to move easily up or down due to clearance provided therein for the pins. Within housing 20 is bevelled boss 92 surrounding piston 30 which connects to a surrounding and ever-deepening groove or ditch 94. Ditch 94 connects to drain hole 96 located at the lowest point thereof. Thus condensation which could seize the piston to the housing is prevented from entering the clearance fit around the piston.

Housing 20 is also provided with a removable cover, not shown, which permits access thereto so that adjustments may be made to the high and low pressure adjusting screws.

Operation of the valve actuator has been described particularly with reference to above-maximum and below-minimum conditions. Between the two extremes, valve actuating stem 88 is raised sufficiently to give a response in valve assembly 12 different to the response already described.

The valve actuator of the present invention has been described primarily in association with a pressure system which provides the appropriate forces against diaphragm 50. It is contemplated that the valve actuator could be used in any system where a mechanical movement proportional to a measurable quantity can be effectively transmitted to piston 30.

The embodiments of the invention in which an exclusive property or privilege is claimed are defined as follows:

1. A valve actuator for actuating a valve in response to a condition which may be above a maximum allowable condition, below a minimum allowable condition or therebetween, comprising:
   a means for sensing said condition;
   b transfer means operatively connected to said sensing means;
   c actuating means operatively connected to said transfer means;
   d first adjustment means for positively setting said minimum allowable condition with respect to said actuating means; and
   e second adjustment means for positively setting said maximum allowable condition with respect to said actuating means and independently of said first adjustment means; whereby said actuating means will operate on said valve such that said valve will respond identically to said below-minimum and above-maximum conditions.

2. A valve actuator according to claim 1 wherein said first adjustment means includes a first adjusting screw attached to said actuating means to effect operation of said valve at said minimum condition and wherein said second adjustment means includes a second adjusting screw attached to a housing enclosing said actuating means and engageable with said actuating means to effect operation of said valve at said maximum condition.

3. A valve actuator for actuating a valve in response to a condition which may be above a maximum allowable condition, below a minimum allowable condition or therebetween, comprising:
   a an elongate housing:
   b condition sensing means supported in one end of said housing;
   c a transfer piston longitudinally supported in said housing and biased towards said sensing means;
   d transfer yoke means attached to said piston at an end remote from said sensing means;
   e toggle bar means pivotally connected to said support means and resiliently biased away therefrom;
   f first adjustment means for positively setting said minimum allowable condition with respect to said bar means; and
   g second adjustment means for positively setting said maximum allowable condition with respect to said bar means; whereby said toggle bar means will operate on said valve such that said valve will respond identically to said above-maximum and below-minimum conditions.

4. A valve actuator according to claim 3 wherein said first adjustment means includes a first adjusting screw attached to said transfer yoke means and engageable with a free end of said bar means to adjustably limit the distance said bar means is biased away from said transfer yoke means and wherein said second adjustment means includes a second adjusting screw attached to said housing and engageable with said bar means to limit travel of its free end away from said one end of said housing.

5. A valve actuator according to claim 4 wherein said transfer yoke means includes a first portion extending generally perpendicular from said piston and a second portion generally parallel thereto and located laterally therefrom at a free end of said first portion, said bar means being pivotally attached to a free end of said second portion and extending therefrom towards said piston, said first adjusting screw being attached to a third portion of said transfer support means diametrically opposed to said first portion.

6. A valve actuator according to claim 5 wherein said bar means is biased from said transfer yoke means by a transfer spring having one end located in a bore in said remote end of said piston, its other end located in a recess in said bar positioned substantially concurrent with said bore and transfer spring guide within said spring and located in said bore to maintain said spring in position.

7. A valve actuator according to claim 6 wherein said second adjusting screw is located between said second portion of said yoke means and said recess and acts as a fulcrum to reverse the direction of travel of the free end of said bar means as said piston and yoke means travel away from said one end of said housing.

8. A valve actuator according to claim 7 wherein said one end of said housing is adapted for operative connection to a condition containing means and wherein the other end of said housing is adapted to receive an actuation element engageable with said bar means and connecting said valve actuator to said valve.

* * * * *